United States Patent [19]

Ito et al.

[11] Patent Number: 5,069,609

[45] **Date of Patent: * Dec. 3, 1991**

[54] MOLD USED IN PRESSURE CASTING CERAMIC ARTICLES

[75] Inventors: Haruyuki Ito; Akio Matsumoto, both of Fukuoka, Japan

[73] Assignee: Toto Ltd., Kitakyushu, Japan

[ * ] Notice: The portion of the term of this patent subsequent to Dec. 5, 2006 has been disclaimed.

[21] Appl. No.: 437,399

[22] Filed: Nov. 16, 1989

Related U.S. Application Data

[63] Continuation-in-part of Ser. No. 77,655, Jul. 24, 1987, Pat. No. 4,884,959.

[30] Foreign Application Priority Data

Jul. 26, 1986 [JP] Japan ................................ 61-176369

[51] Int. Cl.[5] .......................... B28B 1/26; B29C 41/16

[52] U.S. Cl. ...................................... 425/84; 249/113; 249/141; 264/86; 425/85; 425/86; 425/437; 425/DIG. 119

[58] Field of Search ................. 249/80, 113, 134, 141; 264/86; 425/84, 85, 86, 437, 405.1, 546, DIG. 119

[56] References Cited

U.S. PATENT DOCUMENTS

| | | | |
|---|---|---|---|
| 674,341 | 5/1901 | Lustig | 249/79 |
| 771,566 | 10/1904 | Nye | 264/86 |
| 1,625,947 | 4/1927 | Lambie et al. | 264/86 |
| 1,630,762 | 5/1927 | Randall | 425/425 |
| 2,619,702 | 12/1952 | Blackburn et al. | 249/241 |
| 2,632,227 | 3/1953 | Steele et al. | 249/86 |
| 2,669,762 | 2/1954 | Blackburn et al. | 425/437 |
| 2,731,699 | 1/1956 | Dubbs | 425/85 |
| 2,910,759 | 11/1959 | Lifter et al. | 249/141 |
| 2,964,822 | 12/1960 | Tomkins | 264/86 |
| 3,049,769 | 8/1962 | Schultz | 249/70 |
| 3,243,860 | 4/1966 | Whittaker et al. | 425/84 |
| 3,651,861 | 3/1972 | Dehring | 249/70 |
| 3,723,584 | 3/1973 | Nussbaum | 249/134 |
| 3,728,098 | 4/1973 | Giffen | 249/114 |
| 3,733,161 | 5/1973 | Nussbaum | 249/80 |
| 3,993,727 | 11/1976 | Skriletz et al. | 425/437 |
| 4,350,486 | 9/1982 | Crosek et al. | 249/134 |
| 4,413,966 | 11/1983 | Mills et al. | 264/86 |
| 4,437,641 | 3/1984 | Stavitsky et al. | 249/80 |
| 4,664,610 | 5/1987 | Aoyama et al. | 425/85 |
| 4,884,959 | 12/1989 | Ito et al. | 425/84 |

FOREIGN PATENT DOCUMENTS

| | | | |
|---|---|---|---|
| 2204584 | 9/1972 | Fed. Rep. of Germany | 425/85 |
| 5817811 | 4/1963 | Japan . | |
| 56-14451 | 4/1981 | Japan . | |
| 58-208005 | 12/1983 | Japan . | |
| 60-8010 | 1/1985 | Japan . | |
| 110422 | 5/1940 | United Kingdom | 425/85 |
| 792351 | 3/1958 | United Kingdom | 425/84 |
| 0808217 | 1/1959 | United Kingdom | 249/113 |
| 1295055 | 11/1972 | United Kingdom . | |

*Primary Examiner*—Jay H. Woo
*Assistant Examiner*—James P. Mackey
*Attorney, Agent, or Firm*—Fleit, Jacobson, Cohn, Price, Holman & Stern

[57] ABSTRACT

A mold, used in pressure casting ceramic articles, includes a plurality of mold parts set and clamped in combination. Each of the mold parts includes: a porous body forming a filter layer with a generally even thickness and a plurality of channels formed in the inside or outside surface thereof and most running in parallel with the molding surface of the mold for allowing water and air to flow therethrough; a reinforcing iron frame for fitting the porous body therein; and a filler filling up the space between the porous body and the iron frame.

11 Claims, 5 Drawing Sheets

MOLD USED IN PRESSURE CASTING CERAMIC ARTICLES

This application is a continuation-in-part of application Ser. No. 07/077,655, filed July 24, 1987 now Pat. No. 4,884,959 issued Dec. 5, 1989.

BACKGROUND OF THE INVENTION

1. Field of the Invention

The present invention relates to a mold used in pressure casting ceramic articles.

2. Description of the Prior Art

A non-pressurized slip casting process for ceramic articles has been adopted for long together with a lathe molding process and a dry press molding process. Most ceramic articles having especially large size and complex shape have been made by the non-pressurized casting process using a gypsum mold. However, this non-pressurized casting process has a fatal defect obstructing the improvement in productivity. In the non-pressurized casting process, the slip has its water content absorbed into the mold by the mold's capillary action so that the casting rate of the slip on the molding surface cannot be improved drastically. When the gypsum mold is saturated with the water, its capillary action is so weakened that the mold has to be dried up for a long time after every its one or two uses. In order to eliminate those defects concomitant with the non-pressurized casting process, a pressure casting process has recently been developed to propose a variety of pressure molds. However, these molds are accompanied by defects to be urgently solved and raise practical bottlenecks in the pressure casting process.

Specifically, the mold for pressure casting according to the prior art has such a structure that a strong pressure-resisting container or iron box for reinforcement is filled up directly with a slurry or powder (e.g., a mixture of an epoxy resin and sand) for forming a porous layer (as is disclosed in Japanese Patent Laid-Open No. 8010/1985 or 208005/1983 or U.K. Patent No. 1,295,055, for example).

For this structure, it is remarkably difficult to make the strong pressure-resisting container or reinforcing iron box similar to the cast product or article. Due to this difficulty, the porous layer cannot be made evenly thick so that it is locally very thick. The excessive thickness of the porous layer will increase the compression strain due to the slip pressure at the pressure casting step to make the molding surface of the porous layer liable to be cracked. When the cast product is to be removed from the mold, moreover, there arises another defect that the porous layer is caused to bite the product by the reaction of the compression strain, thus making the removing or demolding step difficult.

In the pressure casting process, furthermore, the water forced at the casting step into the porous layer is drained through passages such as channels. For removing the product from the mold, too, these passages are used to blow compressed air into the porous layer to spurt the water and air from the molding surface of the mold. If the mold is constructed of an upper or top part and a lower or bottom part, for example, the product cannot be removed simultaneously from the upper and lower parts. In the current demolding method, therefore, one mold part is evacuated to attract the product whereas the other mold part is supplied with compressed air to remove the product. Then, the evacuation is released to supply compressed air to that one part thereby to remove the product. Those passages are used to evacuate the porous layer during the demolding step. If the water and air fail to come out evenly from the molding surface at the demolding step, the mold release may be partially degraded to produce defective articles.

Incidentally, the mold of the prior art reinforced by the iron box (as is disclosed in U.K. Patent No. 1,295,055 or U.S. Pat. No. 3,243,860, for example) is so constructed that the iron box is formed with holes through which the water and air are guided to spurt into the porous layer. Since the iron box except for a special one is extremely difficult to be made similar to the product, as has been described hereinbefore, the holes of the iron box are spaced irregularly from the molding surface of the mold, thus raising a defect that the demolding is troubled.

In order to eliminate those defects, there has been proposed a mold which is constructed by fixing a wire net in the inner surface of the pressure-resisting container at a desired spacing from the molding surface of the porous mold, connecting a porous conduit for water and air communications to the wire net with its one end extending to the outside of the mold, and by filling up the inside of the pressure-resisting container with slurry for forming the porous layer (as is disclosed in Japanese Patent Laid-Open No. 208005/1983). However, this mold has the aforementioned thick porous layer so that it cannot eliminate the defects of occurrence of the cracks due to the elastic strain at the pressure casting step and the bite of the product by the mold at the demolding step.

In this mold of the prior art, on the other hand, the deformation or breakage of the mold due to the slip pressure in the pressure casting process is prevented by the combined strength of the porous layer and the pressure-resisting container or the iron box. Since the porous layer has a low strength and a small modulus of elasticity, however, the mold is enabled to bear the slip pressure exclusively by the pressure-resisting container or the iron box. Therefore, these container and box have to be drastically strong.

With the structures thus far described, moreover, the mold of the prior art has another defect that the porous layer has to be made thick because the clamping pressure for standing the slip pressure at the casting step is borne by the porous layer having a small modulus of elasticity.

SUMMARY OF THE INVENTION

It is, therefore, an object of the present invention to provide a mold used in pressure casting ceramic articles, which is freed from the above-specified defects of the prior art and suited for practical uses.

According to a major feature of the present invention, there is provided a mold used in pressure casting ceramic articles, which comprises a plurality of mold parts set and clamped in combination and each including: a porous body forming a filter layer with a generally even thickness and a plurality of channels formed in the inside or outside surface thereof and most running in parallel with the molding surface of said mold for allowing water and air to flow therethrough; a reinforcing iron box for fitting said porous body therein; and a filler filling up the space between said porous body and said iron box.

BRIEF DESCRIPTION OF THE DRAWINGS

Other objects, features and advantages of the present invention will become apparent from the following description taken with reference to the accompanying drawings, in which.

DESCRIPTION OF THE PREFERRED EMBODIMENT

The present invention will be described in the following in connection with the embodiment thereof.

Figure 1:
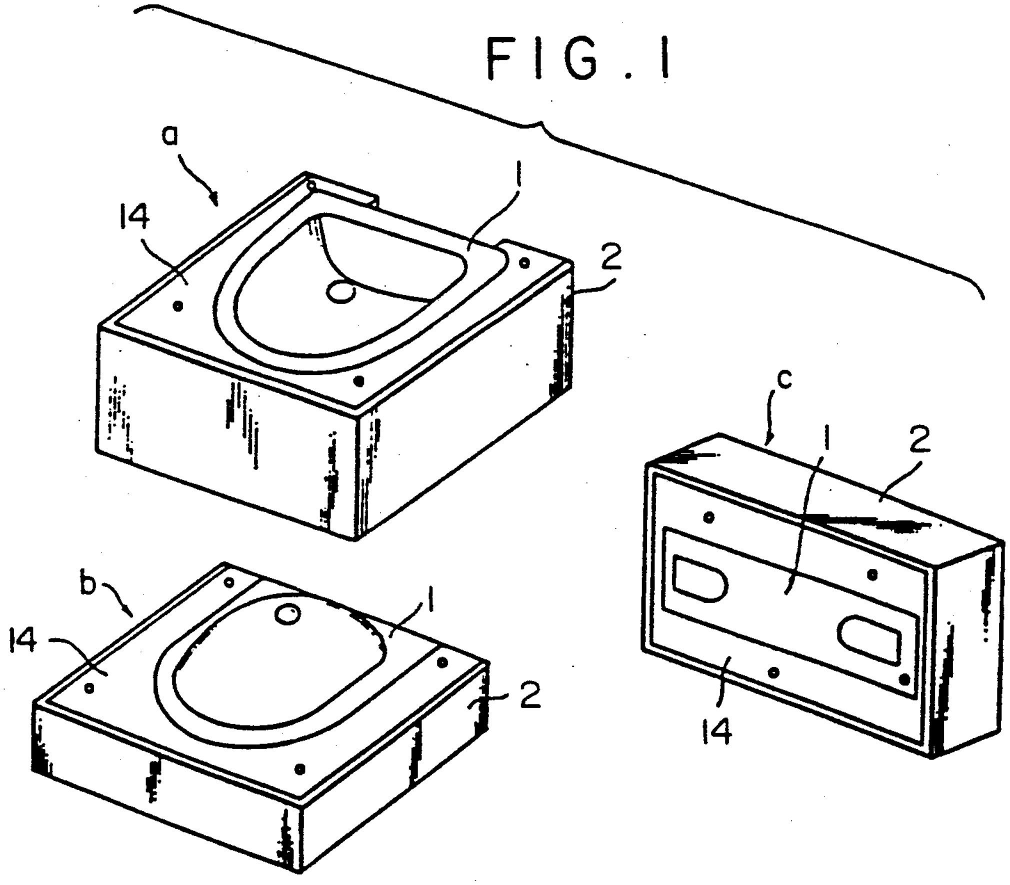
FIG. 1 is a perspective view showing a mold which is composed of three parts, i.e., upper, lower and side mold parts.

A mold 1 used in pressure casting ceramic articles, is composed of three parts, i.e., an upper or top part a, a lower or bottom part b and a side part c, as shown in FIG. 1. These three mold parts a, b and c are set for use, as shown in FIGS. 2 and 3.

Figure 2:
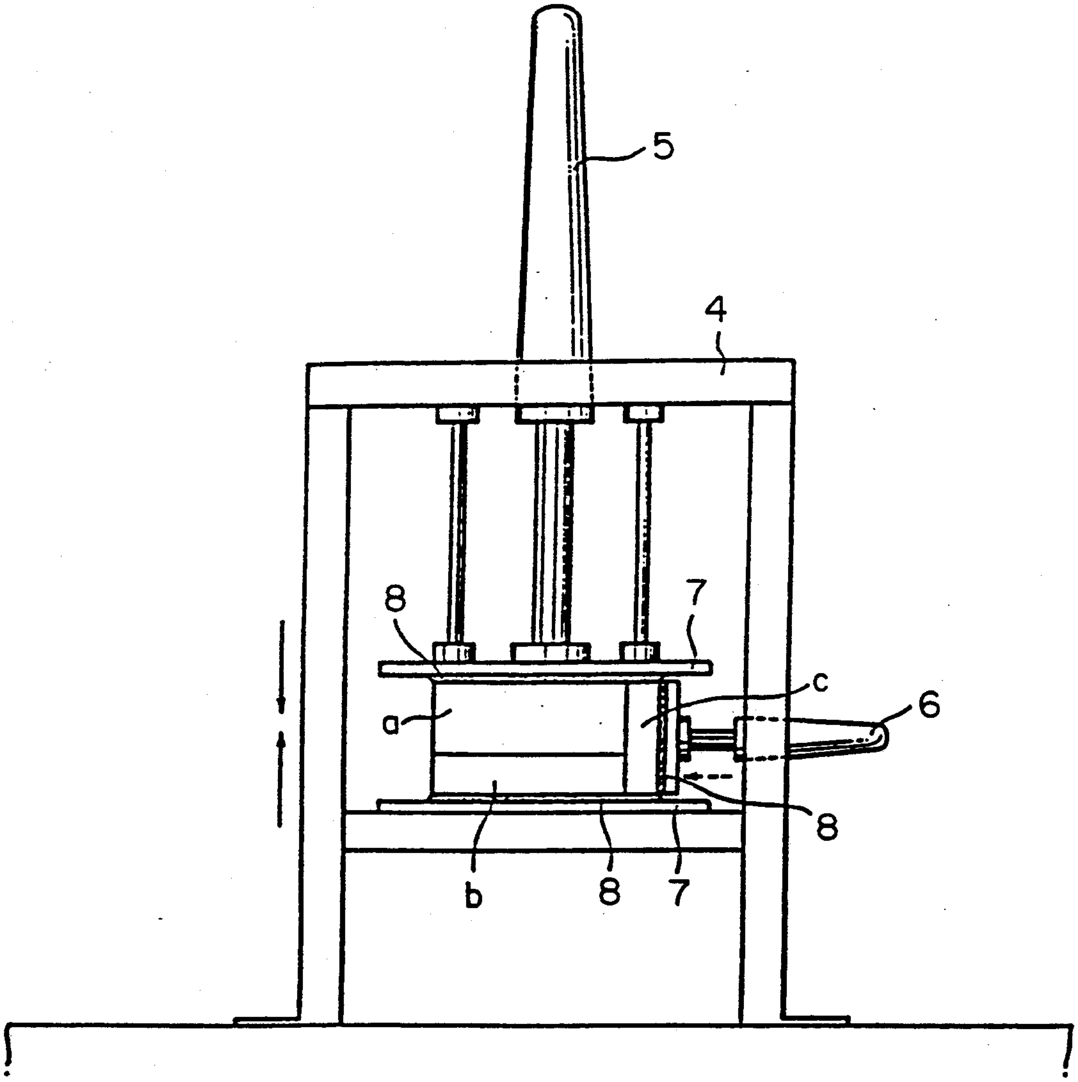
FIG. 2 is a front elevation showing the mold clamper mounted in a casting machine for clamping the three mold parts.

As better seen from FIG. 2, one group of the three mold parts a, b and c are placed altogether in a casting machine 4. The upper part a is attached to a press plate 7 of a main hydraulic cylinder 5 of the casting machine 4 through a resin sheet 8. The lower mold part b is also attached to another press plate 7 of the frame of the casting machine 4 through another resin sheet 8. The side mold part c is also attached to another press plate 7 of an auxiliary hydraulic cylinder 6 of the casting machine 4 through another resin layer 8. These resin layers 8 are used for matching the filler faces of the respective mold parts and the corresponding press plates 7. The resin layers 8 may be made of a resin known under the trade name of "Adhesive Bond E380" produced by Konishi Kabushiki Kaisha. For the mold setting, the upper part a is clamped downward to the lower part b by the action of the hydraulic cylinder 5, whereas the side part c is clamped sideway to the upper and under parts a and b by the action of the hydraulic cylinder 6.

Figure 3:
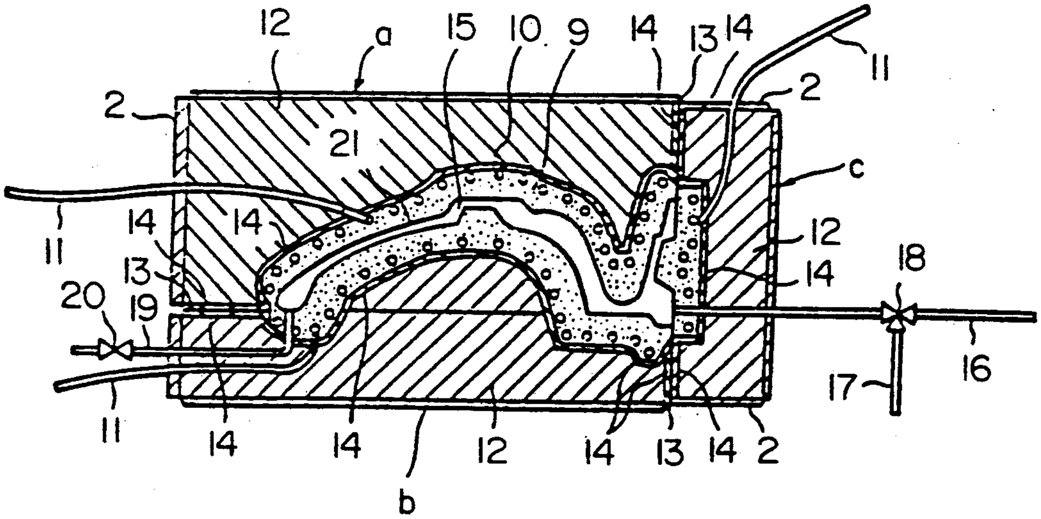
FIG. 3 shows in section the three mold parts clamped.
Figure 4:
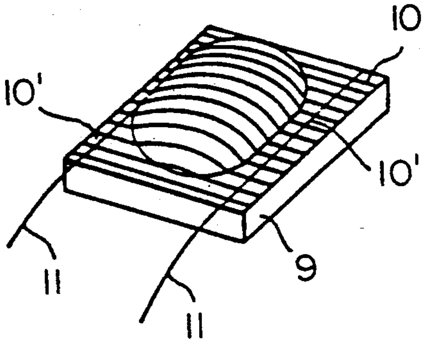
FIG. 4 is a perspective view showing the relation between the porous body and the channels of the mold.

In each cast part, as best seen from the section of FIG. 3, a filter layer made of a porous body 9 is fixed to a filler 12 in a reinforcing iron frame 2 through a resin layer 14 acting as a sealing material. The resin layer 14 is applied to the filler 12 on a matching or parting face 13 of the mold part. The resin layer may be made of an adhesive known under the trade name of "Adhesive Bond E250" produced by Konishi Kabushiki Kaisha. When the three mold parts are set, they are associated to define a mold cavity 15 by their molding surfaces. Denoted at reference numeral 10 are branch channels which are formed in the porous body 9 for allowing water and air to flow therethrough. As schematically shown in FIG. 4, the branch channels 10 run generally in parallel with a molding surface 21 of each mold part and intersect in a communicating manner with trunk channels 10' which are in communication with pipes 11 extending to the outside of the mold part. Denoted at numeral 16 is a pipe for feeding slip under pressure. This slip feeding pipe 16 is opened into the mold cavity 15 through the side mold part c, for example, as shown, to charge the mold cavity 15 with the slip. During the slip casting operation and the subsequent pressure casting operation, the water is drained from the porous body 9 to the outside through the branch channels 10. A slip draining pipe 17 is connected to the pipe 16 through a three-way cock 18 to drain the surplus slip to the outside therethrough after the slip has been cast to a sufficient thickness. Denoted at numeral 19 is an aeration pipe for blowing compressed air to reduce the water content of the cast slip. The aeration pipe 19 is opened into the mold cavity 15 through the lower mold part b, for example, and is equipped with a check valve 20. The branch channels 10 are supplied with compressed air so as to form a water film between the molded article and the molding surface when the article is to be removed from the mold.

According to one of the characteristics of the mold of the present invention, the porous body 9 having a low strength and a small modulus of elasticity is made to have a generally even and small thickness at its mold forming portion thereby to be less elastically deformed due to the compression by the slip pressure at the pressure casting step so that it may be prevented from being cracked and from biting the cast product by the reaction of its compression deformation at the demolding step. In view of the above-specified two points, the better effect can be expected if the mold portion of the porous body is the thinner. Considering the appropriate arrangement of the channels for injecting both the water in the form of a film and the air into the gap between the mold portion of the porous body 9 and the molded product at the demolding step, however, the thickness of the prorous body 9 is determined from preferably 10 to 60 mm, more preferably 15 to 30 mm.

This thickness determination of the porous body 9 is made possible only by sandwiching the sufficiently thick filler layer 12 between the porous body 9 and the reinforcing iron frame 2 in accordance with another characteristic of the present invention.

In the mold of the present invention, the filler 12 is effective not only to fill up the space between the reinforcing iron frame 2 and the porous body 9 but also to bear most of the clamping pressure, which should bear the pressure of several to 30 Kg/cm$^2$ of the slip which is forced under pressure into the mold cavity 15 when the plural or three mold parts a, b and c are set for the pressure casting step. For these effects, the filler 12 is so arranged that it covers most of the matching parting faces. The filler 12 performs the action of a reinforcing material together with the iron frame 2 to prevent the porous body 9 from being broken by the slip pressure at the pressure casting step. Therefore, the filler 12 may preferably be a cement material having a high compression strength and a large modulus elasticity and may preferably be a castable one. In dependence upon the size of the mold, however, the filler to be used may be the mixed material with resin and inorganic power. The fixture of the iron frame 2 and the filler 12 may be effected by means of cement such as reinforced concrete, an adhesive or by physical means. This adhesive may be exemplified by a product of Konishi Kabushiki Kaisha, known under the trade name of "Adhesive Bond E250". In order to enhance the reinforcing effect, the filler 12 may desirably have a thickness of 10 to 40 mm. On the other hand, the resin layer 14 sandwiched between the porous body 9 and the filler 12 is fixed on the outer surface of the porous body 9 at the side of the filler 12 to make a complete seal for preventing the air and water from leaking into the filler 12.

The resin layer 14 on the parting faces 13 is effective to prevent the slip under pressure from leaking from between the mold parts at the pressure casting step. The resin layer 14 may preferably be a flexible one having a thickness of 10 mm or less, preferably 5 mm or less.

Next, the channels 10 formed in the porous body 9 for allowing the water and air to flow therethrough will be described in the following.

These channels 10 are made to have communications with the outside of the mold, as has been described hereinbefore, and are used to spurt water in the slip at the pressure casting step, to inject the compressed air at the demolding step and to evacuate the mold so as to attract the molded product to the mold. In the present invention, as shown in FIG. 4, the numerous branch channels intersect to communicate with one or more trunk channel or canal leading to the outside of the mold such that most of them run in parallel with the molding surfaces of the mold. This arrangement makes the spacing h of the molding surfaces from the channels constant so that the water and air are evenly injected at the demolding step.

Figure 5:
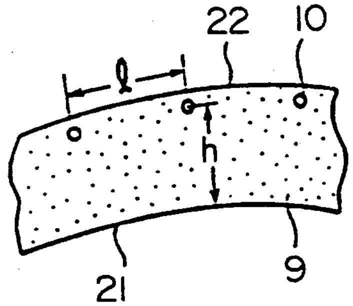
FIGS. 5 and 6 show in section the relations between the channels and the porous body.
Figure 6:
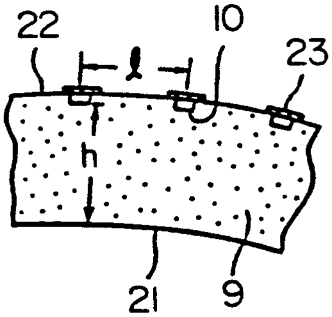

The channels may be formed either inside of the porous body 9, as shown in FIG. 5, or outside, as shown in FIG. 6. In the latter modification, the channels 10 are formed in the form of open grooves in the outer surface 22 of the porous body 9 and have their openings closed with tapes 23.

The interval l of the channels 10 is 0.2 to 3.0, preferably 0.5 to 2.0 times as large as the spacing h of the molding surfaces 21 from the channels 10. The smaller interval will make it difficult to manufacture the mold itself and enlarge the porosity to invite troubles in the strength of the mold. On the other hand, the larger interval will choke the water and air at the demolding step through the molding surfaces extending between the channels to raise other troubles when the product is to be removed from the mold. For the preferable thickness of the porous body of 15 to 30 mm, the interval of the channels 10 is 0.5 to 2.0 times as large as the thickness.

Next, the diameter of the channels is 0.5 to 10 mm, preferably 1 mm to 5.0 mm. The smaller diameter will increase the pressure loss of the compressed air supplied at the demolding step from the outside of the mold to make the injection rates of the water and air uneven at the molding surfaces, thus raising troubles in the demolding step. On the other hand, the larger diameter will increase the porosity of the porous body, especially at the intersections of the channels to possibly break the mold with the compressed air at the demolding step. This limits the preferable range to 1.0 to 5.0 mm.

Figure 7:
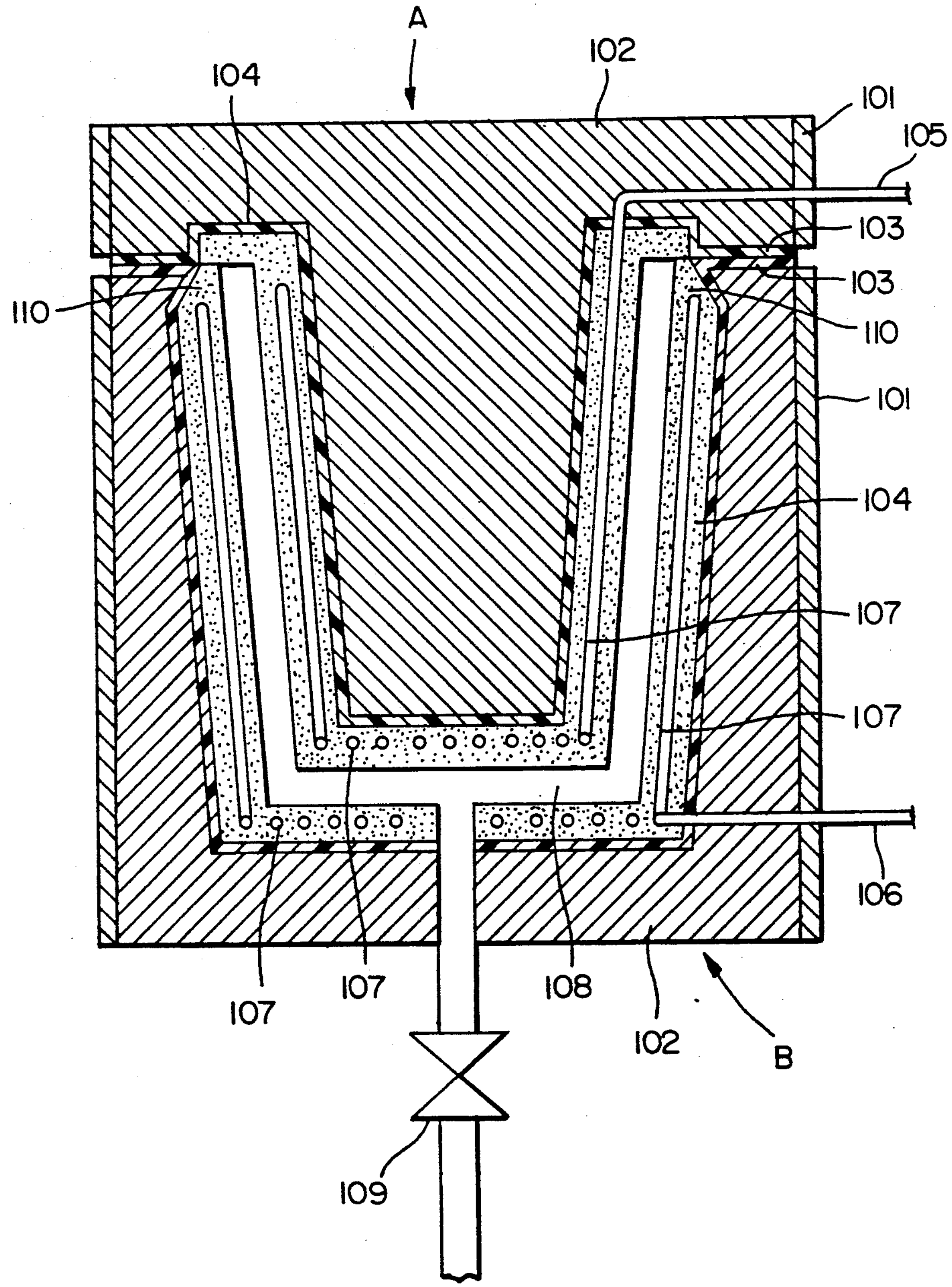
FIG. 7 shows in section a mold which is composed of two parts.

In FIG. 7, a mold is shown including the features of the mold shown and described with respect to FIGS. 1 to 6, however, in FIG. 7, the mold includes two mold parts A and B, reinforcing iron frame 101 for reinforcement, filler 102, resin layer 103, porous body 104, pipe 105, pipe 106, channels 107, mold cavity (molding space) 108, and material supply valve 109. The thickness of porous body 104 at 110 near the parting face between mold parts A and B is preferably thinner than the even thickness of the filter layer at regions other than at 110. In operation, the upper and lower mold A and B are joined and fixed to each other. The valve 109 is opened, and material is supplied through the valve 109 into the mold cavity 108 from material source (not shown) to fill the mold cavity 108 with the material. The material in the mold cavity 108 is pressurized through the valve 109 by utilizing a pressurizing device and the like (not shown) for a predetermined time period. The valve 109 is then closed. Compressed air is supplied into the channels 107 of the lower mold B through the pipe 106 of the lower mold B to form a water layer between a molding surface of the lower mold B and a surface of a molded article, the molded article being held on the upper mold A and the upper mold A lifted to remove the lower mold B. A receiving plate is arranged for receiving the molded article under the upper mold A, compressed air is supplied into the channels 107 of the upper mold A through the pipe 105 of the upper mold A and the upper mold A is removed utilizing the water layer.

As has been described hereinbefore, according to the present invention, the filler is effective to bear most of the clamping pressure at the parting faces and to act as a reinforcing member together with the iron frame for preventing the porous body from being broken by the slip pressure. As a result, the porous body can be made relatively thin. According to the present invention, moreover, the channels are arranged at a constant spacing from the molding surfaces so that they can inject the water and air evenly at the demolding step. By properly selecting the interval of the channels, still moreover, the water and air can flow out all over the molding surfaces to smooth the demolding step of the produced article.

We claim:

1. A mold for use in pressure slip casting ceramic articles, said mold comprising:
- a plurality of mold parts set and clamped in combination under a clamping pressure and each mold part including:
  - a porous body having a low strength forming a filter layer with a generally even thickness and a plurality of channels formed therethrough for removing through the porous body water of the slip in a molding cavity formed between interior surfaces of said mold parts by clamping together said mold parts and for injecting compressed air through the porous body toward a molded product during a demolding step and for evacuating air through the porous body so as to attract the molded product to said mold parts, with a majority of said plurality of channels running parallel with a molding surface of said mold for allowing water and air to flow therethrough;
  - a resin layer applied to exterior surfaces of said porous body for preventing leakage of air and water from said porous body;
  - a reinforcing frame for fitting said porous body therein; and
  - a filler having a high compression strength relative to said porous body filling up the space between said resin layer on said porous body and said frame and for bearing the clamping pressure,
- parting faces of said mold parts being covered by said resin layer and contacting each other and having a major portion of said parting faces being supported by said filler to prevent slip under pressure from leaking from said molding cavity under the clamping pressure, and
- at least one of said mold parts including means for feeding slip into said molding cavity.

2. A pressure casting mold according to claim 1, wherein said porous body has a thickness of 10 to 60 mm.

3. A pressure casting mold according to claim 1, wherein said filler has a thickness of at least 10 mm between said porous body and said frame.

4. A pressure casting mold according to claim 1, wherein said resin layer includes a resin sealing the exterior surface of said porous body contacting with said filler; and means for fixing said filler to said porous body and said frame.

5. A pressure casting mold according to claim 4, wherein said fixing means includes an adhesive applied between said filler and said porous body.

6. A pressure casting mold according to claim 4, wherein said fixing means includes cement applied between said filler and said porous body.

7. A pressure casting mold according to claim 1, wherein said channels are arrayed at an interval of 0.2 to 3 times as wide as a spacing from the molding surface of said mold to said channels.

8. A pressure casting mold according to claim 1, further comprising at least one pipe connected to said channels for providing communications with the outside of said mold.

9. A pressure casting mold according to claim 1, wherein said channels have an effective diameter of 0.5 to 10.0 mm.

10. A pressure casting mold according to claim 1, wherein said channels are formed in the form of open grooves in an outer surface of said porous body and having openings of said grooves closed with tapes.

11. A pressure casting mold according to claim 1, wherein a thickness of said filter layer at said parting faces of said mold parts is thinner than said even thickness of said filter layer which is located at regions other than at said parting faces.

* * * * *